US010742686B2

(12) United States Patent
Rantzau et al.

(10) Patent No.: US 10,742,686 B2
(45) Date of Patent: Aug. 11, 2020

(54) ENFORCING NETWORK ENDPOINT POLICIES IN A CLOUD-BASED ENVIRONMENT USING A COVERT NAMESPACE

(71) Applicant: CISCO TECHNOLOGY, INC., San Jose, CA (US)

(72) Inventors: Ralf Rantzau, San Jose, CA (US); Rajath Agasthya, San Jose, CA (US); Sebastian Jeuk, Munich (DE); Sridar Kandaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 16/116,521

(22) Filed: Aug. 29, 2018

(65) Prior Publication Data

US 2020/0076851 A1 Mar. 5, 2020

(51) Int. Cl.
*H04L 29/06* (2006.01)

(52) U.S. Cl.
CPC .......... *H04L 63/20* (2013.01); *H04L 63/0263* (2013.01); *H04L 63/04* (2013.01); *H04L 63/18* (2013.01)

(58) Field of Classification Search
None
See application file for complete search history.

(56) References Cited

U.S. PATENT DOCUMENTS

| 9,135,050 B2 * | 9/2015 | Kothari ............... G06F 9/45558 |
| 2013/0091543 A1 * | 4/2013 | Wade ...................... G06F 21/54 726/1 |
| 2016/0117246 A1 * | 4/2016 | Maurice ................. G06F 12/08 711/130 |
| 2016/0373355 A1 | 12/2016 | Zhang et al. |
| 2020/0021518 A1 * | 1/2020 | Yan ......................... H04L 49/70 |

FOREIGN PATENT DOCUMENTS

| CN | 107566152 A | 1/2018 |
| KR | 101729945 B1 | 4/2017 |

* cited by examiner

*Primary Examiner* — Andrew J Steinle
(74) *Attorney, Agent, or Firm* — Merchant & Gould P.C.

(57) ABSTRACT

A method and apparatus for dynamic integration of a covert namespace are provided. A Software-Defined Networking (SDN) controller is configured to send a request for workload transfer to an endpoint where the endpoint is connected to a virtual switch. The SDN controller determines that a connection between the endpoint and the virtual switch is secure based on a tenant-specific policy associated with the endpoint. A first covert namespace is configured to be connected between the endpoint and the virtual switch to communicate to the endpoint and the virtual switch directly. The operations of the virtual switch are executed using the first covert namespace according to the tenant-specific policy. A workload is caused to be transmitted to the endpoint through the first covert namespace.

20 Claims, 4 Drawing Sheets

ENFORCING NETWORK ENDPOINT POLICIES IN A CLOUD-BASED ENVIRONMENT USING A COVERT NAMESPACE

FIELD OF THE DISCLOSURE

One technical field of the present disclosure is enforcement of policies of virtual switches and network endpoints in diversified cloud computing environments. The present disclosure also relates to integration of a namespace in a cloud-based environment. Another technical field is managing a covert namespace in multi-cloud deployments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer application programs executed in cloud environments are now widely used to deploy large-scale services for large numbers of client computers. As the number of client computers increases and the type of services varies, clouds are becoming ever more diversified. For example, environments that use different hardware, virtual switches, public cloud resources, private cloud resources and different vendors are expected to interoperate. In these multi-cloud deployments, however, implementing policies for virtual switches may change from one cloud to another cloud and maintaining consistent enforcement at endpoints becomes difficult. Thus, for more consistent and secure cloud connectivity, allowing workload mobility across the cloud computing platforms while maintaining adherence to client-specific policies becomes more important in multi-cloud deployments.

BRIEF DESCRIPTION OF THE DRAWINGS

The example embodiment(s) of the present invention is illustrated by way of example, and not in a way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described in sections below according to the following outline:

1. GENERAL OVERVIEW
2. EXAMPLE COMPUTER SYSTEM IMPLEMENTATION
   2.1 SSL OFFLOAD CAPABILITIES
   2.2 COVERT NAMESPACE AS A TAP INTO TRAFFIC TO CONTAINER
   2.3 HTTP RE-WRITE OPERATIONS
   2.4 SECURE ACCESS TO HARDWARE-BASED RESOURCES
   2.5 SECURE COMMUNICATION BETWEEN CONTAINERS
3. EXAMPLE PROCESSES AND ALGORITHMS
4. IMPLEMENTATION MECHANISMS-HARDWARE OVERVIEW

1. GENERAL OVERVIEW

Techniques for managing a namespace in a computer environment, including enforcing consistent policies for endpoints communicating with virtual switches, are described. In one embodiment, a Software-Defined Networking (SDN) controller is configured or programmed to send a request for workload transfer to an endpoint where the endpoint is connected to a virtual switch. The SDN controller determines that a connection between the endpoint and the virtual switch is secure based on a tenant-specific policy associated with the endpoint. In an embodiment, a first covert namespace is configured to be connected between the endpoint and the virtual switch to communicate to the endpoint and the virtual switch directly. The operations of the virtual switch are executed using the first covert namespace according to the tenant-specific policy. The covert namespace can take over the operations of the virtual switch. A workload is sent to the endpoint through the first covert namespace to cause transmitting the workload to the endpoint.

In some embodiments, configuring the first covert namespace comprises the steps of determining bandwidth requirements of the first covert namespace. For example, the bandwidth of the first covert namespace is determined. If the bandwidth of the first covert namespace is lower than a threshold bandwidth, then SDN controller determines that the first covert namespace can take on more functionalities and can allocate the first covert namespace to be placed between the endpoint and the virtual switch.

In another embodiment, if the bandwidth associated with the first covert namespace is higher than the threshold bandwidth, a second covert namespace may be initialized. The SDN controller determines that the first covert namespace is no longer available to take on more functionalities (e.g., busy with existing operations) and configures the second covert namespace to be connected between the endpoint and the virtual switch.

In some embodiments, the operations of the virtual switch include Secure Sockets Layer (SSL) offload operations, Test Access Point (TAP) operations, HTTP re-write operations, Layer 7 (L7) operations, allocating a portion of hardware-based resources to the first covert namespace where the portion of the hardware-based resources is mapped through the first namespace, and generating a secure connection between two or more containers.

2. EXAMPLE COMPUTER SYSTEM IMPLEMENTATION

Figure 1:
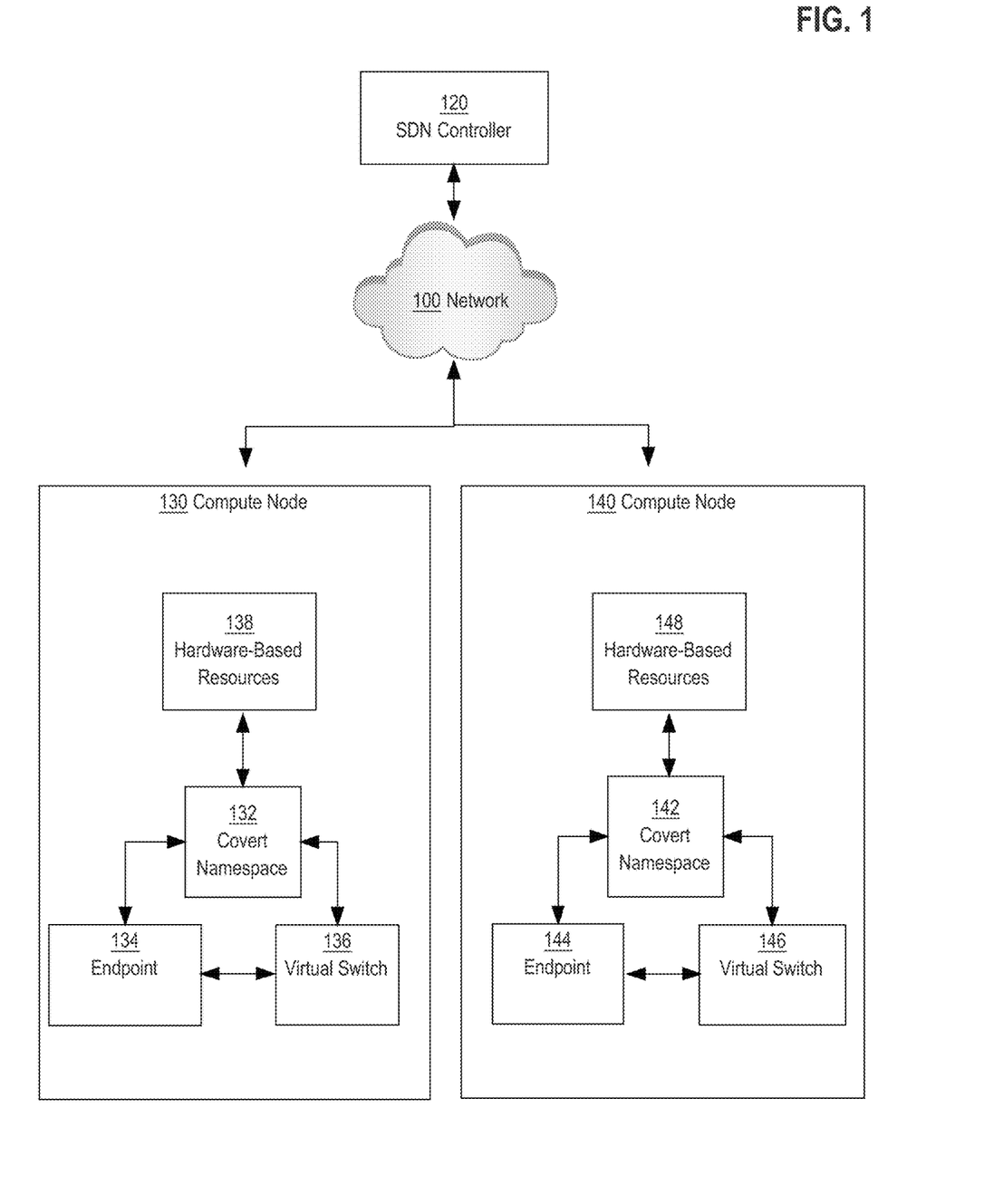
FIG. 1 illustrates an example diagram of a cloud orchestration system for managing a covert namespace.

FIG. 1 depicts an example diagram of a cloud orchestration system for managing a covert namespace.

The example of FIG. 1 includes a Software-Defined Networking (SDN) controller 120 and one or more compute nodes 130 and 140 communicatively coupled over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The SDN controller 120, and compute nodes 130 and 140, and other elements of the system may each comprise an interface compatible with the network 100 and are programmed or configured to use standardized protocols for communication across the networks such as TCP/IP, and higher-layer protocols such as HTTP, TLS, and the like.

Each compute node includes a respective covert namespace, endpoint, and virtual switch, and hardware-based resources. As illustrated in FIG. 1, the compute node 130 includes covert namespace 132, endpoint 134, virtual switch 136, and hardware-based resources 138. The compute node 140 includes covert namespace 142, endpoint 144, virtual switch 146, and hardware-based resources 148. Each compute node is communicatively coupled to the SDN controller 120 over the network 100.

The SDN controller 120 is a computing element that may be a cloud administrator. In some embodiments, the SDN controller can be a controlling application. The cloud controller is programmed to perform cloud orchestration to manage the compute nodes and can assist integration of the virtual switch and the endpoint within the compute node. The SDN controller 120 is configured or programmed to define whether a covert namespace is necessary for a specific endpoint and manage the covert namespace within the compute node.

For purposes of illustrating a clear example, the compute node 130 and its components have been described with certain functions. The same operations can be performed in the compute node 140. Within the compute node 130, the endpoint 134 and the virtual switch 136 have a direct channel (i.e., connection) which allows the endpoint 134 to have direct communication with the virtual switch 136. In some embodiments, the endpoint 134 can be a virtualized container or a virtual machine (VM). For purposes of illustrating a clear example, the container has been described with certain functions. The same operations can be performed using the virtual machine or other such end points.

In another embodiment, the endpoint 134 can be a specific tenant or client and may include a plurality of tenant-specific policies. These tenant-specific policies are local rules that are only compatible within the corresponding compute node 130. Therefore, the policies associated with the endpoint 134 may be different from the policies associated with the endpoint 144. The tenant-specific policies for the endpoint 134 might not transfer to the different compute node without performing a policy translation.

The virtual switch 136 may implement a logical collection of virtual ports and configured to manage communication on the network. The virtual switch can process, switch and route traffic from all the endpoints on a specific compute node. In some cases, a single virtual switch handles heavy traffic from the endpoints. The virtual switch 136 executes tenant-specific operations that are compatible with the tenant-specific policies. The operations can include, but not limited to, Secure Sockets Layer (SSL) offload operations, Test Access Point (TAP) operations, HTTP re-write operations, Layer 7 (L7) operations, allocating a portion of hardware-based resources to the first covert namespace, and generating a secure connection between two or more containers.

For security and performance purposes, the use of virtual switch 136 in these instances can be avoided by moving the functionalities to a namespace, allowing consolidation and management of these operations by the namespace. Namespaces are used as virtual routers in systems like OpenStack, providing a tenant-specific separation for Layer 3 (L3) functionality. These namespaces represent the virtual equivalent of a physical router providing forwarding and often other L3 capabilities like address translations. However, these namespaces are visible and are actual entities on the network with their routable IP address.

In contrast, covert namespace 132 is a namespace that is hidden from the layers of the tenant and the endpoint. The covert namespace can also be hidden from the network 100. The covert namespace 132 is an administrator-controlled entity located close to the endpoint and performs different services. For example, the covert namespace 132 is capable of virtualizing and separating resources for a specific task. The covert namespace 132 provides an entry point to the network traffic directly destined for the endpoint 134, after the virtual switch operations are completed and before the endpoint consumes the traffic. It facilitates a multitude of applications that would otherwise be difficult to achieve on a per-endpoint basis.

The covert namespace 132 can inherit some of the functions typically performed by the virtual switch 136. In some cases, the covert namespace 132 can inherit more functions than what the virtual switch 136 can perform. Functions may be performed dynamically within a container environment or a service mesh and can also be performed on-demand based on the container environment or the virtual machine. Generally, the covert namespace can serve multiple purposes. For example, the covert namespace can be used for troubleshooting purposes, thereby offloading valuable processing power from the actual service. Examples of troubleshooting functions include specific endpoint issues, SSL offload, or HTTP re-write.

A dynamic and on-demand deployment of the covert namespace is facilitated to tap into the traffic flow. The deployment of the covert namespace can be done without disrupting the actual application or service within the endpoint. Moreover, the covert namespace could be used as a dynamic and on-demand fast-path channel for endpoints within the same environment or tenant to exchange high-performance information, while assuring a dedicated and non-shared secure exchange of information within a fully virtualized environment.

As illustrated in FIG. 1, the covert namespace 132 can be introduced between the endpoint 134 and the virtual switch 136. From an endpoint perspective, the connection to the covert namespace 132 might not look different than the direct connection to the virtual switch 136. The same principle can apply to the virtual switch 136. From a virtual switch perspective, the connection to the covert namespace 132 might not look any different than the direct connection to the endpoint 134. The virtual switch 136 may recognize that the endpoint 134 is directly connected to one of the ports of the endpoint 134.

By placing the covert namespace between the endpoint and virtual switch, fast connection options can be used to avoid latency without going through the virtual switch and impacting other tenants. An example option is "memif".

Dynamic integration of the path between the virtual switch and the endpoint is facilitated and the covert namespace can be placed into the data-path. This approach can be used with endpoints that are implemented as containers or VMs. In some cases, channels between the virtual switch and the endpoint through the covert namespace exists as well as the direct channel between the virtual switch and the endpoint depending on the configuration and environment.

The covert namespace 132 is configured to detect relevant policies and perform policy configuration. The configuration of policies can be hidden from the virtual switch, although the virtual switch 136 is aware of the associated policies and the flow of traffic between interfaces. In some cases, the virtual switch 136 cannot detect the covert namespace 132 and the functions performed by the covert namespace 132. The virtual switch 136 may distinguish the ports connected to the covert namespace 132 from the ports directly connected to the endpoint 160, because the ports connected to the covert namespace 132 may be tagged differently and may indicate that specific ports are facilitated for covert namespace capabilities.

The tenant-specific policies can be defined and merged by the SDN controller and can be transferred across the platform with the workload. For example, when the workload moves from one cloud to another cloud, or from one virtual switch to another virtual switch, the policies can be transferred with the workload. This facilitates all the endpoint-specific policies to transfer without performing policy translation at each entity. Consolidating the management of policies can improve the governance of the compute node.

2.1 SSL OFFLOAD CAPABILITIES

Figure 2:
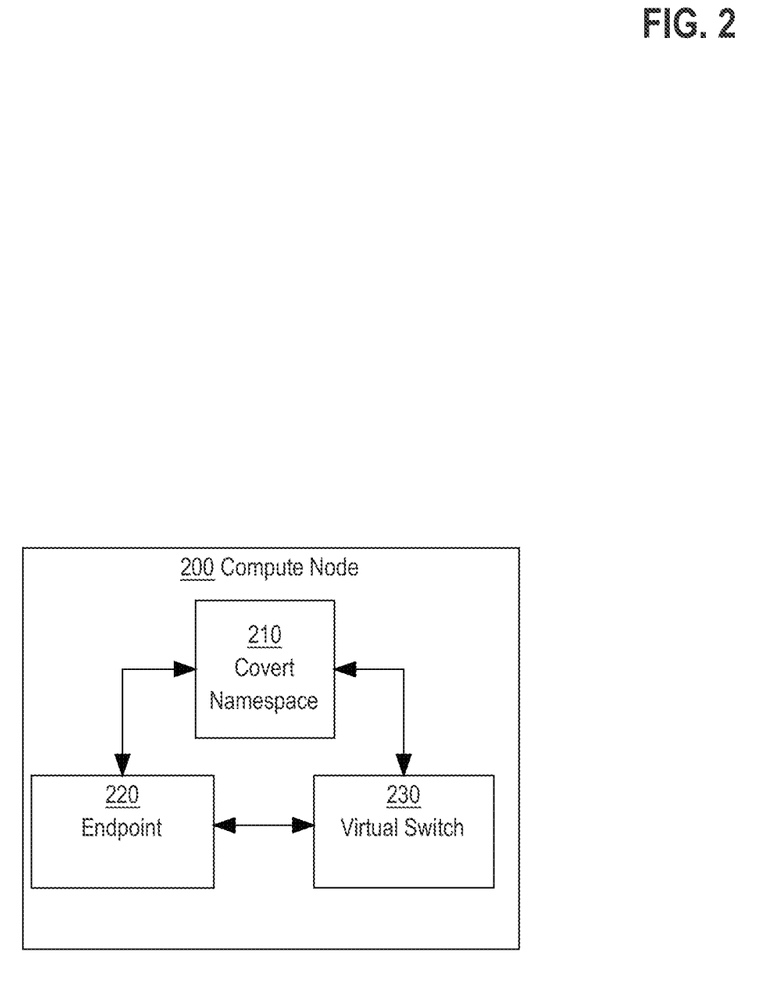
FIG. 2 illustrates an example diagram of a compute node with the covert namespace.

FIG. 2 illustrates an example diagram of a compute node 200 with the covert namespace. In some embodiments, the covert namespace 210 allows Secure Sockets Layer (SSL) offload capabilities on a per-container basis. The covert namespace, independent of the workload running within the endpoint, can perform the SSL offload operations, thereby reducing the load on the container itself.

The covert namespace 210 allows the SSL offload capabilities being performed by the cloud administrator, rather than the tenant or application owner who owns the endpoint. The covert namespace 210 can be responsible for maintaining and handling SSL offload operations. Hence, it can make key sharing easier since the tenant using the endpoint does not need to participate. As a result, the tenant might not be aware that the SSL offloading is performed by the covert namespace 210. The tenant is aware that the SSL offloading is being performed, because in some cases, it may request the microservices and SSL offloading. However, the tenant might not be aware that the SSL offloading is performed by the covert namespace 210.

In another embodiment, the covert namespace 210 can virtualize and segment the crypto chip on board to manage the access to allow a level of indirection between the endpoint and the actual crypto hardware. For the purposes of the crypt, multiple covert namespaces facilitate segmenting and virtualization of the crypto chip or its hardware to manage the access.

2.2 COVERT NAMESPACE AS A TAP INTO TRAFFIC TO CONTAINER

The covert namespace 210 can be used as a Test Access Point (TAP) into the traffic between the endpoint 220 and the virtual switch 230. For network performance, the TAP can be used to collect and monitor data traffic to measure data latencies in the network. The TAPs can be located at various points of the network depending on the configuration. The covert namespace 210 can offload the TAP operation off of the virtual switch and can perform the TAP operation without overloading and burdening the virtual switch 230. In some embodiments, the covert namespace's TAP operation can be very specific to a particular endpoint and can be used to perform lawful intercept operations on a per-endpoint basis.

Since the cloud administrator controls the covert namespace, the tenant may be unaware of the TAP operation. Still, when the TAP operation is implemented in a product, provisions can be made in a way that the tenants can choose which operations the cloud administrator is authorized to perform in the covert namespace. By doing so, the tenant can mitigate any privacy concerns that can arise from the cloud administrator controlling the covert namespace.

The covert namespace may include at least two interfaces. One side of the covert namespace may be connected to the endpoint 220 and the other side of the covert namespace may be connected to the virtual switch 230. The namespace may include an additional interface connected to a sniffer that runs within the same namespace. In some cases, the sniffer may run in a different namespace. If the system receives a request to run "tcpdump" on the interfaces to monitor the traffic flow to and from the virtual switch and the endpoint, the sniffer may receive the duplicated packets from a source port or destination port to do the TAP operation for multicasting. For example, the covert namespace 210 may be responsible for sending the packet to two or more different applications that are facilitated and running at the same time and may receive the same traffic from the applications.

2.3 HTTP RE-WRITE OPERATIONS

The covert namespace 210 can be used to perform HTTP re-write operations that are necessary within an environment. The HTTP re-write operations may be performed on a per-container basis. In some embodiments, the covert namespace can be used to perform more generic Layer 7 (L7) operations. The HTTP re-write operations or the L7 operations can be performed at the same time as the SSL offloading operations. For example, the SSL offloading can be performed first, the encryption can be removed, then the HTTP rewriting or L7 operations can be performed.

As described above with respect to the TAP operation, neither endpoint nor tenant owning the endpoint is aware of the HTTP re-write operations or L7 operations. Even the virtual switch is unaware that the covert namespace performs the HTTP rewriting or L7 communication. These operations can be performed based on the input and definitions provided by the cloud administrator.

In some embodiments, the client may send a request to a certain URL that might not exist. In this case, the covert namespace can rewrite the non-existing URL to an existing URL. Often, the new URL can be a private name or a hidden name that the tenant or the user of the application does not know. For example, internal IP addresses or usernames can be hidden, and a more general username can be generated.

The covert namespace can be run by a service that inspects the information and handles the re-writing operations. The service includes policies defined through the SDN controller that defines what re-write operations need to be taken care of for specific traffic. This service can perform on its own or can work in connection with other services. For example, another service outside the covert namespace can encapsulate and send the packet to the covert namespace. In another embodiment, encapsulation can be performed within the covert namespace. Also, for low balancing mechanism, the round-robin algorithm can be used to change the URL. For example, the multiple sub-URLs can be processed by the round-robin algorithm to reach the service.

2.4 SECURE ACCESS TO HARDWARE-BASED RESOURCES

The covert namespace 210 can provide dynamic and controlled access to parts of hardware resources such a Graphics Processing Unit (GPU), audio card, crypto cards or crypto engines. The covert namespaces can be used to map fractional parts of these resources for endpoint's use. For example, the cloud administrator allocates a portion of the hardware-based resources (e.g., GPU) to the covert namespace. The covert namespace may be initialized upon the allocation of the resources. Any interactions to the shared portion of the hardware-based resources can be mapped through the covert namespace as opposed to exposing the hardware-based resources directly to the endpoint 220. Thus, the covert namespace can have visibility to that portion of the hardware-based resources which are securely and segregated from other endpoints, only allowing the allocated portion to be used by the specific endpoint. In another word, the resources can strain to that portion of the GPU, ensuring only the allocated portion can be used by the endpoint through the covert namespace, leaving the unallocated portion intact from the endpoint. The endpoint may be unaware of this customization of resources since validating the bounds is carried out by the covert namespace.

The same principle can apply in a multi-tenancy environment. For example, each covert namespace of multiple covert namespaces may own a unique fractional part of the resources and it can provide secure access with multi-tenancy. By managing the on-demand access through the covert namespace, the specifics of the mappings can be abstracted from the endpoints and can be insulated from any changes causing from the migration of workload.

2.5 SECURE COMMUNICATION BETWEEN CONTAINERS

The covert namespace can be used to provide a secure, "off-the-record" channel to communicate between two or more containers (e.g., back-channel communication). It could be used to provide an out-of-band channel to exchange OAM-like (Operation, Administration, Management) messages. Additionally, this approach can provide a way for endpoints to communicate with each other without interrupting or causing load issues in virtual switches. It introduces a temporary communication channel, which allows transmitting large data volumes or securely exchange information that can't be sent across a shared environment. In one embodiment, a single covert namespace manages all the endpoints associated with the single covert namespace and each endpoint communicates with the single covert namespace directly. In another embodiment, each endpoint is associated with a corresponding covert namespace. A very network specific interface like a Mammoth interface can be placed between namespaces and these interfaces can have direct communications with the endpoints. The communication channel can be set up dynamically and temporarily based on the volume of data and configuration settings.

3. EXAMPLE PROCESSES AND ALGORITHMS

Figure 3:
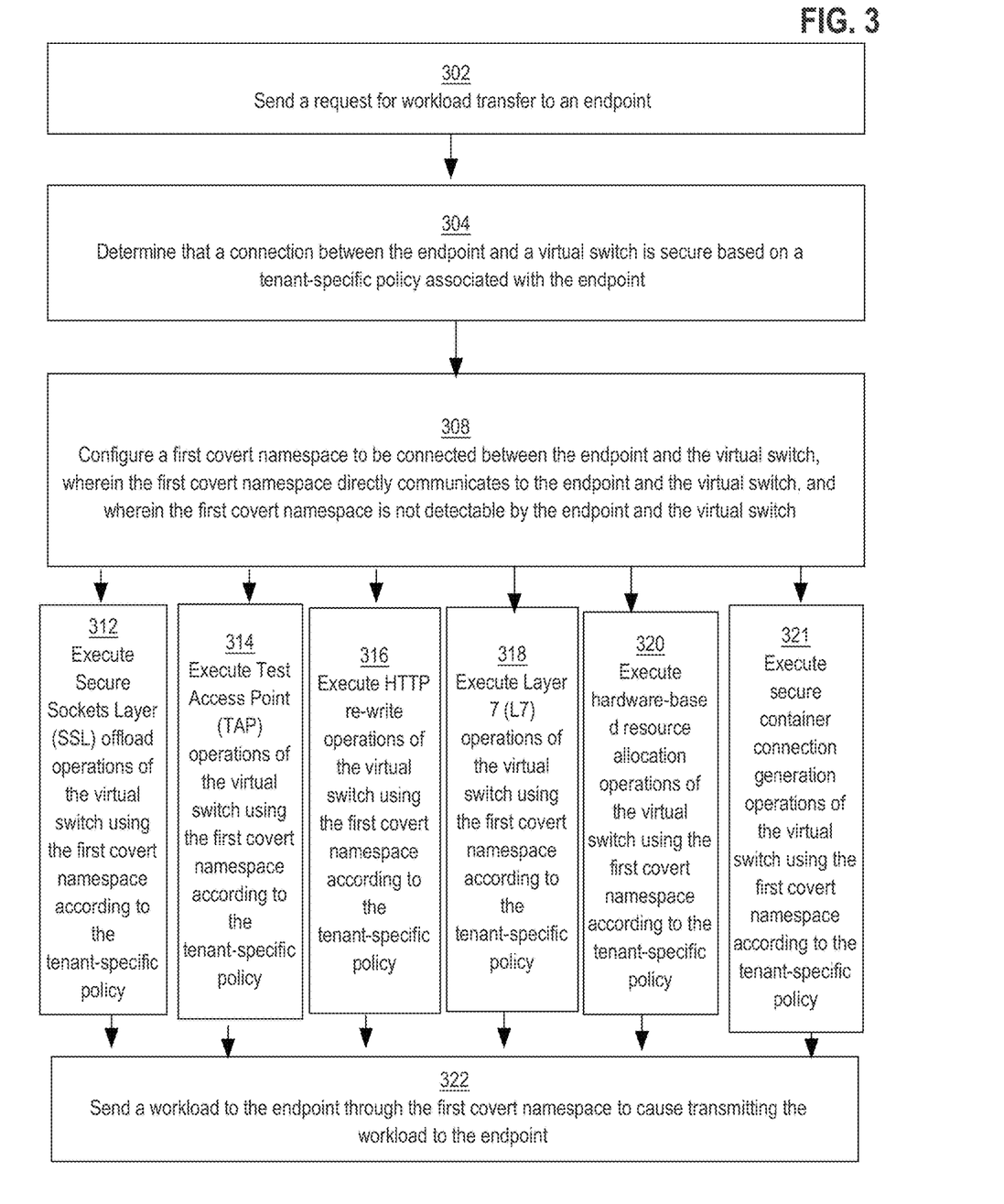
FIG. 3 illustrates an example method for managing the covert namespace in a cloud-based environment.

FIG. 3 illustrates an example flow diagram of processes for managing the covert namespace in a cloud-based environment. FIG. 3 is intended to disclose an algorithm or functional description that may be used as a basis of writing computer programs to implement the functions that are described herein, and which cause a computer to operate in the new manner that is disclosed herein. Further, FIG. 3 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of the process may be performed in any order and are not limited to the order shown in FIG. 3.

The steps of the process may involve a controller, such as a software-defined network (SDN) controller. The SDN controller can be either one of the cloud administrator, the tenant, or the application. The SDN controller may do the orchestration of the entities within the compute node. The process may begin with step 302. In step 302, the SDN controller starts communication with the endpoint. For example, the SDN controller sends a request for workload transfer to the endpoint indicating that the SDN controller needs to send five Giga bytes of traffic in the next twenty minutes.

In step 304, the SDN controller is configured to check the existence of the connection between the endpoint and the virtual switch, and determine that the connection is secure based on the tenant-specific policy associated with the endpoint. The endpoint may include a plurality of local policies that are directly relevant to the endpoint. The policies can transfer across the platform with the workload.

In step 308, the SDN controller can configure a first covert namespace to be connected between the endpoint and the virtual switch. The first covert namespace is introduced between the endpoint and the virtual switch. The first covert namespace is controlled by the SDN controller. As described above, the first covert namespace directly communicates with the virtual switch and the endpoint. Since the operations are offloaded from the virtual switch, the virtual switch is not aware that the first covert namespace takes over the operations. Thus, the first covert namespace is not detectable by the virtual switch. The endpoint may be aware that these operations, however, might not be aware that it is the first covert namespace who process, switch, and route the traffic. The SDN controller is configured to offload functions that are heavy on a single virtual switch such as lawful intercept per tenant and endpoint, span per tenant. The performance can be improved and dynamic access to resources are facilitated.

In step 310, the SDN controller executes the operations of the virtual switch using the first covert namespace, allowing the first covert namespace to provide the functions offered by the virtual switch and to improve tenant performance. The operations can include SSL offload, HTTP re-write, L7, TAP operations, allocating a portion of hardware-based resources, and generating a secure connection between containers. The available operations are not limited to the above-described operations but can include other operations that are not described above. In step 312, the workload can be sent to the endpoint through the first covert namespace. The SDN controller is programmed to send the workload to the endpoint through the first namespace. The first covert namespace transmits the workload to the endpoint.

In some embodiments, configuring the first covert namespace may comprise the steps of determining a bandwidth of the first covert namespace. For example, the bandwidth of the first covert namespace and a threshold bandwidth are determined. If the bandwidth of the first covert namespace is lower than the threshold bandwidth, then the first covert namespace is allocated to take more functionalities. The SDN controller determines that the first covert namespace can take on more functionalities and allocate the first covert namespace to be placed between the endpoint and the virtual switch.

In another embodiment, if the bandwidth associated with the first covert namespace is higher than the threshold bandwidth, a second covert namespace may be initialized. The SDN controller determines that the first covert namespace is no longer available to take on more functionalities (e.g., busy with existing operations) and configure the second covert namespace, different from the first covert namespace, to be connected between the endpoint and the virtual switch.

4. IMPLEMENTATION MECHANISMS-HARDWARE OVERVIEW

Figure 4:
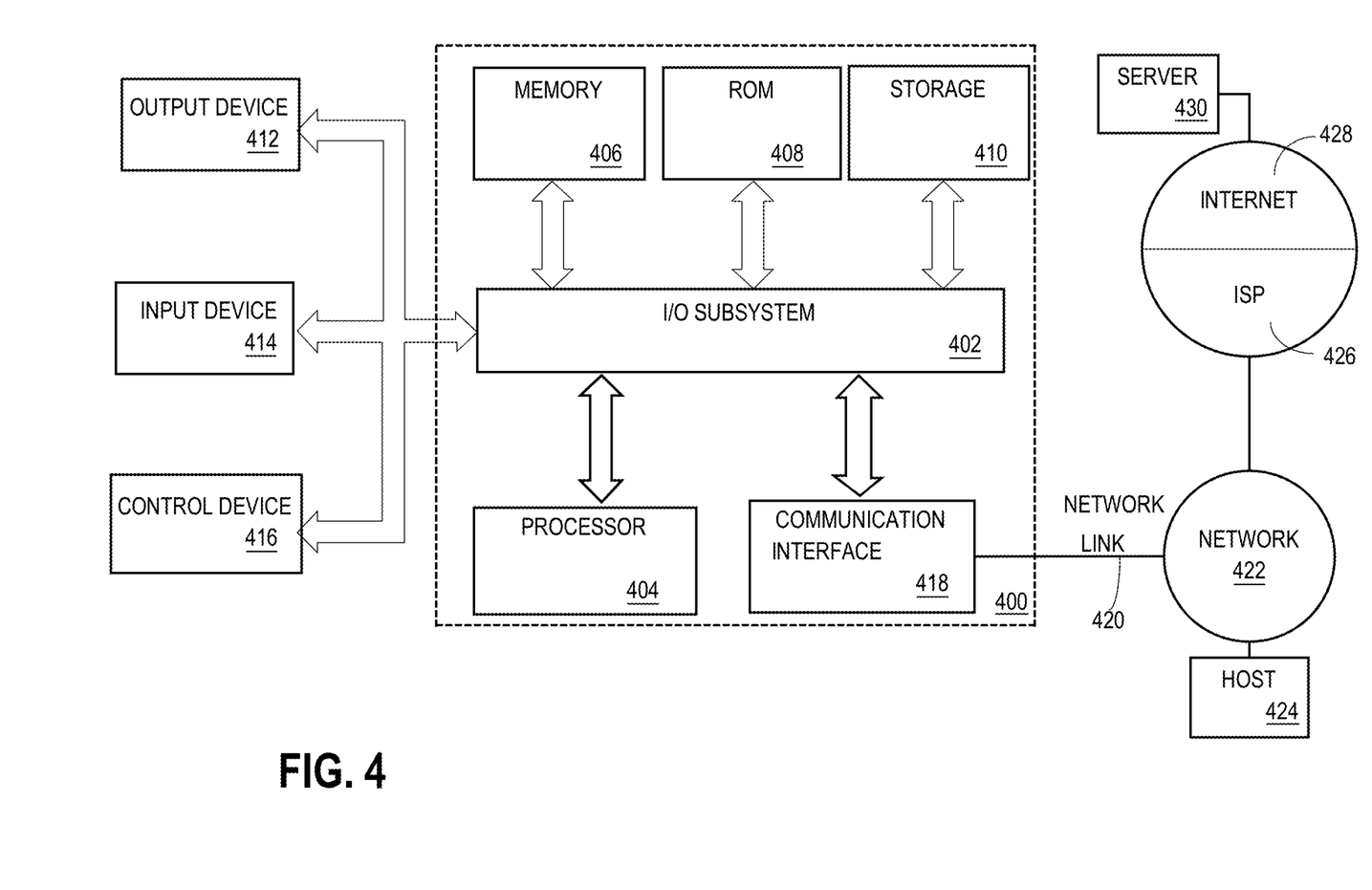
FIG. 4 illustrates an example block diagram that illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   sending, using a software-defined networking (SDN) controller, a request for workload transfer to an endpoint, wherein the endpoint is connected to a virtual switch;
   determining, using the SDN controller, that a connection between the endpoint and the virtual switch is secure, based on a tenant-specific policy that is associated with the endpoint;
   configuring, using the SDN controller, a first covert namespace to be connected between the endpoint and the virtual switch, wherein the first covert namespace directly communicates to the endpoint and the virtual switch, and wherein the first covert namespace is not detectable by the endpoint and the virtual switch;
   executing, using the SDN controller, operations of the virtual switch using the first covert namespace according to the tenant-specific policy; and
   sending, using the SDN controller, a workload to the endpoint through the first covert namespace to cause transmitting the workload to the endpoint.

2. The method of claim 1, wherein the operations of the virtual switch that are executed using the SDN controller comprise Secure Sockets Layer (SSL) offload operations.

3. The method of claim 1, wherein the operations of the virtual switch that are executed using the SDN controller comprise Test Access Point (TAP) operations.

4. The method of claim 1, wherein the operations of the virtual switch that are executed using the SDN controller comprise HTTP re-write operations.

5. The method of claim 1, wherein the operations of the virtual switch that are executed using the SDN controller comprise Layer 7 (L7) operations.

6. The method of claim 1, wherein the operations of the virtual switch that are executed using the SDN controller comprise allocating a portion of hardware-based resources to the first covert namespace.

7. The method of claim 6, further comprising mapping the portion of the hardware-based resources through the first covert namespace.

8. The method of claim 1, wherein the operations of the virtual switch that are executed using the SDN controller comprise generating a secure connection between two or more containers.

9. The method of claim 1, wherein the configuring the first covert namespace comprises:
determining, using the SDN controller, that a bandwidth associated with the first covert namespace is lower than a threshold bandwidth; and
configuring the first covert namespace by allocating the first covert namespace to transmit the workload to the endpoint.

10. The method of claim 1, further comprising:
determining, using the SDN controller, that a bandwidth associated with the first covert namespace is higher than the threshold bandwidth; and
configuring a second covert namespace to be connected between the endpoint and the virtual switch by initializing the second covert namespace.

11. A system comprising:
one or more processors;
a memory communicatively coupled to the one or more processors storing instructions which, when executed by the one or more processors, cause the system to:
send, using a software-defined networking (SDN) controller, a request for workload transfer to an endpoint, wherein the endpoint is connected to a virtual switch;
determine, using the SDN controller, that a connection between the endpoint and the virtual switch is secure, based on a tenant-specific policy that is associated with the endpoint;
configure, using the SDN controller, a first covert namespace to be connected between the endpoint and the virtual switch, wherein the first covert namespace directly communicates to the endpoint and the virtual switch, and wherein the first covert namespace is not detectable by the endpoint and the virtual switch;
execute, using the SDN controller, operations of the virtual switch using the first covert namespace according to the tenant-specific policy; and
send, using the SDN controller, a workload to the endpoint through the first covert namespace to cause transmitting the workload to the endpoint.

12. The system of claim 11, wherein the operations of the virtual switch that are executed using the SDN controller comprise Secure Sockets Layer (SSL) offload operations.

13. The system of claim 11, wherein the operations of the virtual switch that are executed using the SDN controller comprise Test Access Point (TAP) operations.

14. The system of claim 11, wherein the operations of the virtual switch that are executed using the SDN controller comprise HTTP re-write operations.

15. The system of claim 11, wherein the operations of the virtual switch that are executed using the SDN controller comprise Layer 7 (L7) operations.

16. The system of claim 11, wherein the operations of the virtual switch that are executed using the SDN controller comprise allocating a portion of hardware-based resources to the first covert namespace.

17. The system of claim 16, wherein the portion of the hardware-based resources are mapped through the first covert namespace.

18. The system of claim 11, wherein the operations of the virtual switch that are executed using the SDN controller comprise generating a secure connection between two or more containers.

19. The system of claim 11, wherein the instructions further cause the system to:
determine, using the SDN controller, that a bandwidth associated with the first covert namespace is lower than a threshold bandwidth; and
configure the first covert namespace by allocating the first covert namespace to transmit the workload to the endpoint.

20. One or more non-transitory computer-readable media storing instructions, wherein the instructions, when executed by one or more processors, cause a computing device to:
send, using a software-defined networking (SDN) controller, a request for workload transfer to an endpoint, wherein the endpoint is connected to a virtual switch;
determine, using the SDN controller, that a connection between the endpoint and the virtual switch is secure, based on a tenant-specific policy that is associated with the endpoint;
configure, using the SDN controller, a first covert namespace to be connected between the endpoint and the virtual switch, wherein the first covert namespace directly communicates to the endpoint and the virtual switch, and wherein the first covert namespace is not detectable by the endpoint and the virtual switch;
execute, using the SDN controller, operations of the virtual switch using the first covert namespace according to the tenant-specific policy; and
send, using the SDN controller, a workload to the endpoint through the first covert namespace to cause transmitting the workload to the endpoint.

* * * * *